C. M. MURCH.
Running-Gears for Vehicles.

No. 154,512.  Patented Aug. 25, 1874.

UNITED STATES PATENT OFFICE.

CHAUNCEY M. MURCH, OF CINCINNATI, OHIO.

IMPROVEMENT IN RUNNING-GEARS FOR VEHICLES.

Specification forming part of Letters Patent No. 154,512, dated August 25, 1874; application filed June 17, 1874.

*To all whom it may concern:*

Be it known that I, CHAUNCEY M. MURCH, of Cincinnati, Hamilton county, Ohio, have invented certain new and useful Improvements in Wheeled Vehicles, of which the following is a specification:

This invention relates to that class of drays, or other wheeled vehicles for transporting heavy loads, whose platforms or beds are brought into as close proximity to the ground as circumstances will allow; and my improvement consists in a novel construction of bracket-frame for coupling the forward end of the platform with the front axle, and without depending upon the body of the vehicle to assist in stiffening said bracket-frame.

The aforesaid bracket-frame coupling is composed of a series of T angle-iron bars, which are disposed in such a manner as to receive the weight longitudinally, instead of transversely, of said bars, thereby enabling the dray to support a very heavy load without unduly increasing the weight of material employed in constructing the same, as will be hereinafter more fully explained.

Figure 1:
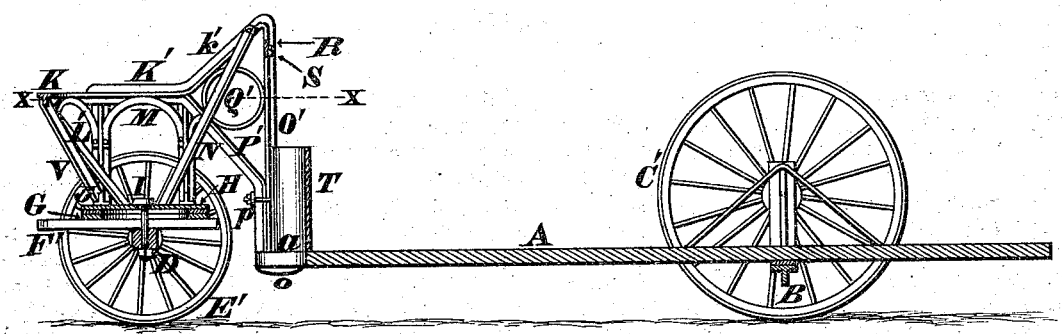
Figure 2:
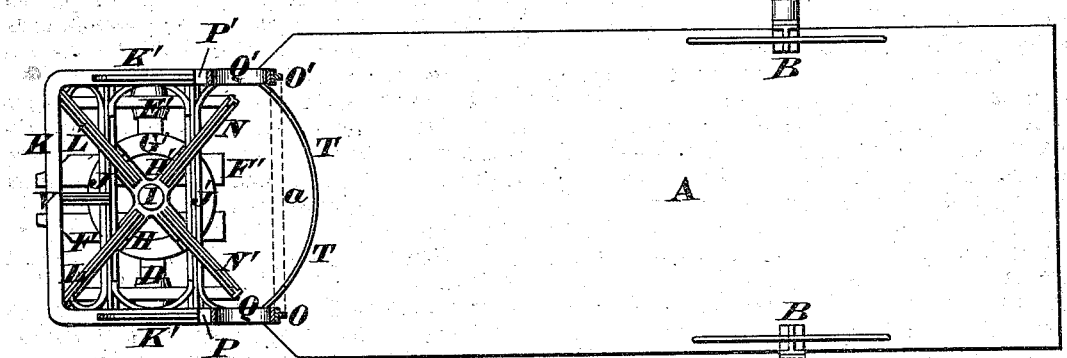
Figure 3:
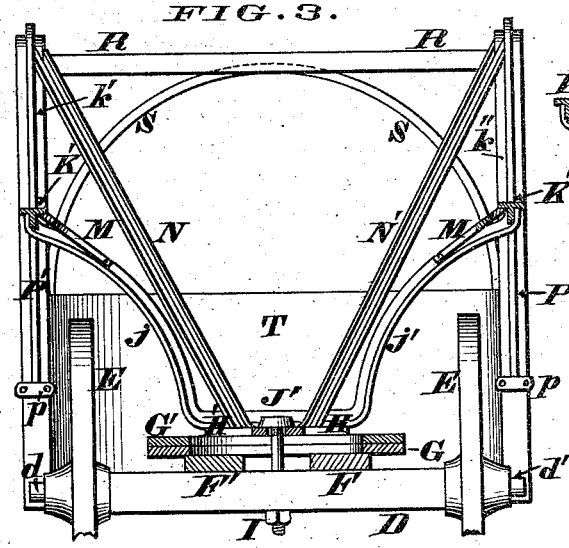
Figure 4:
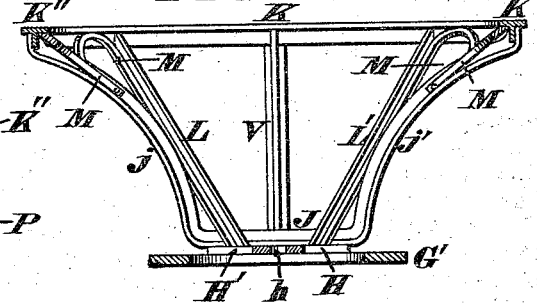

Figure 1 is a vertical longitudinal section of a dray provided with my improved form of bracket-frame coupling. Fig. 2 is a horizontal section of the same at the line $x$ $x$. Fig. 3 is an enlarged vertical section through the front axle and its accessories, the view being taken looking rearwardly. Fig. 4 is a vertical section through the upper member of the fifth-wheel and its adjuncts, the view being taken looking forwardly.

A represents the bed or platform of a dray, or transfer-wagon, or vehicle of any kind, and the rear portion of said platform is supported upon a bent axle, B, whose two spindles, $b$ $b'$, have the wheels C C' journaled upon them. The front axle D is considerably shorter than the rear axle, so as to enable it to be brought in near proximity to the front end of the platform without liability of striking the wheels E E', or subjecting the bracket-frame to excessive strain.

This front axle is coupled to the forward part of the vehicle by a bracket-frame, which is constructed as follows: Secured to the upper side of axle D are two horizontal bars, F F', to which the pole of the vehicle is applied, and said bars support the lower member G of the fifth-wheel, the upper member G' of the same having two diagonal plates, H H', attached to it. These plates are perforated at their common center $h$ for the reception of the king-bolt I. Secured to the ends of these diagonal plates, and running transversely of the vehicle, are angle-irons J J', whose ends are curved upwardly, as at $j$ $j'$, for the support of the side members K' K'' of a rail, K, which also is formed of T angle-iron. The front portion K of this rail is supported by a T angle-iron prop, V, which connects with the horizontal bar J at or near the mid-length of the same. The junction of the side members K' K'' with the front member K of the rail are supported upon inclined T angle-irons L L', which slope inwardly or toward the king-bolt I, and have their lower ends secured to the diagonal plates H H', as more clearly shown in Fig. 2. Curved braces M are interposed between the upturned members $j$ $j'$, irons L L', and rail K K' K'', for the purpose of imparting additional rigidity to the general framework of the bracket. The inclined braces L L' are supplemented by two other inclined braces, N N', which project obliquely from the plates H H' upward and rearwardly, and are joined, respectively, to the extensions $k'$ $k''$ of the side members K' K'' of the aforesaid rail. These extensions $k'$ $k''$ slope upwardly, and are secured to vertical bars O O', which are composed of T angle-irons, and said bars are bent at their lower ends, as at $o$, for the support of the front portion of the platform, as seen in Fig. 1. P P' are inclined braces, which extend from the rear of rail K K down to the bars O O', and are attached to the same by clips or other retaining devices $p$ $p'$. Q Q' are annular or hoop braces, which occupy the triangular spaces between the members $k'$ $k''$, O O', and P P', and they act to retain said members in their proper positions with reference to each other. R is a transom, which unites the upper portions of the bars O O', said transom being composed of T angle-iron. The transom is stiffened by an arch-brace, S, whose ends are bolted or otherwise securely attached to the vertical bars O O'. The forward end of the platform is recessed at $a$, to permit the front axle D being turned around the king-bolt I in either direction, and without coming in contact either with said platform or any part of the supporting-frame. T is a dash-board or fender, which prevents the driver or any portion of the load falling through the recess a.

It will be seen that the system of T angle-irons composing my bracket-frame coupling not only serves to suspend the platform from the front axle in the most secure manner, but it also acts as a receptacle for containing barrels, bags, and other goods, the weight of which, resting directly upon said front axle, would entirely obviate any tendency to spring the said bracket-frame. It is also apparent that, owing to the peculiar manner in which the various members of the frame are arranged, there can be no such thing as a transverse strain brought to bear upon the T angle-iron braces and other stiffeners; but, on the contrary, all such strains act longitudinally of said irons, thereby rendering it impossible for any load that can be placed upon the platform to spring or bend the bracket-frame out of its proper shape.

This support longitudinally of the T angle-irons occurs no matter in what direction the strain is brought to bear upon the frame-work, as the inclined braces V, L L', and N N', and curved bars $j j'$ M, stiffen said frame so thoroughly as to render it equally secure at all points, and any forward, rearward, lateral, or diagonal surge is fully guarded against.

As considerable material is necessarily employed in constructing the frame-work, an immense weight would be added to that of the vehicle in case said frame should be composed of ordinary flat or round bars; but by using T angle-irons for all the various members of the bracket-frame, I obtain the maximum of strength with the least possible amount of material.

For railroad transportation service at night one of my recently-patented double-reflecting lanterns may be mounted upon the transom R, so as to afford a flood of light both for the guidance of the team and convenience of the driver.

The described open-work cup or basket form of my connection between the platform and the upper member of the fifth-wheel is believed to secure the strongest possible attachment with the least practicable expenditure of material.

I claim as my invention—

1. The frame-coupling for vehicles, composed of T angle-iron, in open basket form, substantially as set forth.

2. The bracket-frame coupling, consisting of the two diagonal plates H H', up-curved braces J J' $j j'$, rail K, supported at its front end by the prop V, in combination with the T angle-irons L L', inclined inwardly toward the king-bolt, and their lower extremities secured to the diagonal plates H H', and the inclined braces N N' and P P', vertical bars O O', transom R, and annular braces Q Q', constituting an open-braced connection between the depressed platform A and the upper member G' of the fifth-wheel, as set forth.

In testimony of which invention I hereunto set my hand.

CHAUNCEY M. MURCH.

Attest:
GEO. H. KNIGHT,
O. P. CAYLOR.